Patented Feb. 5, 1929.

1,701,081

UNITED STATES PATENT OFFICE.

MARTIN NILSSON, OF PEEKSKILL, NEW YORK, ASSIGNOR TO THE FLEISCHMANN COMPANY, OF NEW YORK, N. Y., A CORPORATION OF OHIO.

FOOD PRODUCT.

No Drawing.   Application filed March 2, 1926.   Serial No. 91,816.

This invention relates to food products and more particularly to food products prepared from yeast, such as for example, compressed or baker's yeast, and has as a general object, the production of food products of improved quality in a convenient and economical manner.

A more particular object is to treat yeast in such a manner that not only are the flavor and keeping qualities thereof improved, but that the yeast retains all of its desirable dietetic and therapeutic properties and a large proportion of its baking strength.

Other objects of the invention will in part be obvious and will in part appear hereinafter.

Heretofore it has been suggested to prepare food products by autolyzing yeast with acids, alkalies, salts, acetone, gum arabic and the like, separating the plasma from the cell residue and evaporating the extract thus obtained to the desired consistency. It has also been suggested to use sugar as an autolyzing agent instead of the other substances above mentioned and it has even been asserted by some that by treating yeast with a sufficient amount of sugar a food product of high nutritive value and good keeping qualities might be obtained. These heretofore known processes have however, been inefficient in that they have either so modified the yeast cell as to render it unsatisfactory for baking purposes or have treated the cell or the extract therefrom in such a manner as to destroy certain desirable therapeutic properties.

Such difficulties are avoided according to the present invention by treating the yeast in such a manner and with such substances that the entire yeast cell and the treating agents remain in the resultant product, and the temperature of the mass need never exceed that at which the yeast was grown, namely about 30° C.

In carrying out the present invention compressed yeast, preferably compressed baker's yeast, is first partially dried to reduce the moisture content thereof, as for example, to about 55%. This partial drying may be carried out in any desired manner although it is preferably carried out by passing properly tempered air over or through the yeast at a temperature of about 25° C.

This partially dried yeast is then mixed to the desired consistency as for example to the consistency of a heavy syrup, with sugar in any convenient form, as for example, dry cane sugar (sucrose) or a heavy syrup thereof or an equivalent sugar or mixture of sugar such as glucose, dextrose, invert sugar or the like. A desirable moisture content of the resultant mass is about 20% and the sugar content should be around 60% or over. It will therefore be understood that in case a sugar or sugar syrup containing water is used in place of the cane sugar suggested above, the partial drying of the compressed yeast should be continued sufficiently to compensate for the added moisture thus entering into the mass.

An examination of the product produced by the present procedure shows that the yeast cells contained therein are entirely unimpaired either from the standpoint of the life of the cell or the vitamine content, while the flavor thereof is markedly improved. The product also has unlimited keeping quality at ordinary temperatures and at these temperatures will retain its baking strength for up to 10 days, while at lower temperatures, as for example 20° C., or below, the baking strength will be retained for much longer periods.

Important features of the procedure outlined above are that throughout the treatment the yeast need not be subjected to a temperature at any time in excess of 25°–30° C., and the preliminary partial drying of the compressed yeast allows of regulating the moisture content of the resulting product without necessitating a subsequent concentration of the final product. Moreover if it is desired to use the final product in bread making, the sugar material may be so apportioned to the yeast that the product may be substituted in the dough mix for the usual quantity of yeast and sugar.

Since certain changes in carrying out the above process, and certain modifications in the composition which embody the invention, may be made without departing from its scope, it is intended that all matter contained in the above description shall be interpreted as illustrative and not in a limiting sense.

Having described my invention, what I claim as new and desire to secure by Letters Patent is:

1. A process of treating yeast which includes partially drying compressed yeast and mixing therewith sugar material until a syrupy consistency is obtained.

2. A process of treating yeast which comprises partially drying compressed yeast and mixing therewith sugar material until the resultant product has a moisture content of about 20% and a sugar content of about 60%.

3. A process of treating yeast which comprises drying compressed yeast until it has a moisture content of about 55% and mixing therewith dry sugar until the resulting product has a sugar content of about 60%.

4. A process of treating yeast which comprises drying compressed yeast until it has a moisture content of about 55% and mixing therewith dry sugar until the resulting product has a moisture content of about 20% and a sugar content of about 60%.

5. A process of treating yeast which comprises drying compressed yeast at a temperature not substantially in excess of 30° C., until it has a moisture content of about 55% and mixing therewith dry sugar until the resulting product has a moisture content of about 20% and a sugar content of about 60%.

6. As an article of manufacture a food product comprising compressed yeast which has been partially dried at a temperature not substantially in excess of 30° C., admixed with sugar material to a consistency of not over 20% moisture.

7. As an article of manufacture a food product comprising compressed yeast which has been dried to a moisture content of about 55% at a temperature not substantially in excess of 30° C., admixed with dry sugar material in an amount such that the resulting product has a moisture content of about 20% and a sugar content of about 60%.

In testimony whereof I affix my signature.

MARTIN NILSSON.